(12) United States Patent
Palathingal

(10) Patent No.: US 6,390,632 B1
(45) Date of Patent: May 21, 2002

(54) BLIND-SPOT PROOF AUTOMOBILE SIDE-VIEW MIRROR

(76) Inventor: Jose Chakkoru Palathingal, 424 Guadarrama La., Miradero Hills, Mayaguez, PR (US) 00680

( * ) Notice: Subject to any disclaimer, the term of this patent is extended or adjusted under 35 U.S.C. 154(b) by 0 days.

(21) Appl. No.: 09/707,818

(22) Filed: Nov. 7, 2000

(51) Int. Cl.[7] .................. G02B 5/08; G02B 7/182; B60R 1/06
(52) U.S. Cl. .............. 359/850; 359/851; 359/855; 359/866; 359/872; 359/883
(58) Field of Search .................. 359/850, 851, 359/852, 855, 864, 865, 866, 868, 871, 872, 883

(56) References Cited

U.S. PATENT DOCUMENTS

| | | | |
|---|---|---|---|
| 1,808,740 A | | 6/1931 | Weatherbee |
| 3,708,222 A | * | 1/1973 | Stern .................. 359/851 |
| 3,806,232 A | | 4/1974 | Gray |
| 3,861,785 A | * | 1/1975 | Barbour .................. 359/851 |
| 3,908,056 A | * | 9/1975 | Anderson .................. 359/851 |
| 4,301,321 A | * | 11/1981 | Bartels |
| 4,674,850 A | * | 6/1987 | Blom .................. 359/851 |
| 4,800,868 A | * | 1/1989 | Appeldorn et al. ......... 359/853 |
| 4,989,964 A | * | 2/1991 | Meise .................. 359/851 |
| 5,113,292 A | * | 5/1992 | Simson .................. 359/851 |
| 5,235,469 A | * | 8/1993 | Horian .................. 359/871 |
| 5,838,505 A | | 11/1998 | Palathingal |
| 5,847,889 A | * | 12/1998 | Komiyama et al. ......... 359/851 |
| 6,074,068 A | | 6/2000 | Palathingal |

FOREIGN PATENT DOCUMENTS

| | | | | |
|---|---|---|---|---|
| DE | 2550095 | * | 5/1976 | .................. 359/851 |

\* cited by examiner

*Primary Examiner*—Ricky D. Shafer

(57) ABSTRACT

A major cause of road accidents is the well-known blind spot present within the field of view of side-view mirrors of automobiles, in particular of the left. Innovations have been made in the past and recently in designing mirrors that avoid the blind spot, and have been patented. They have some inadequacies however. This invention is based on observation of the distinct roles played by different sections of a side-view mirror. The lower section of the mirror alone accounts for view of the road region close to the auto, wherein the blind spot is located. The invention therefore presents now a modified lower section that makes viewing the blind spot region possible without introducing a curved configuration.

20 Claims, 7 Drawing Sheets

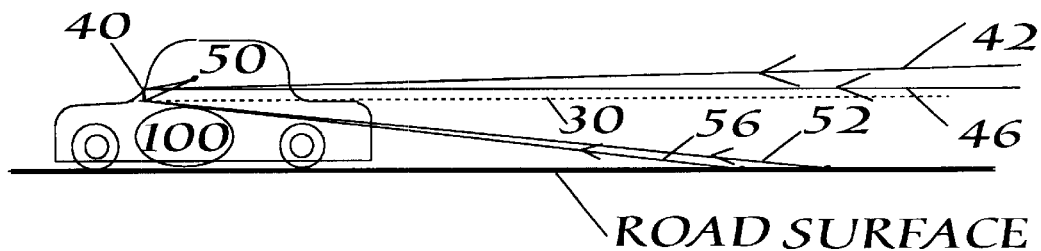
*SIDE VIEW : PRIOR ART*  FIG. 1(a)
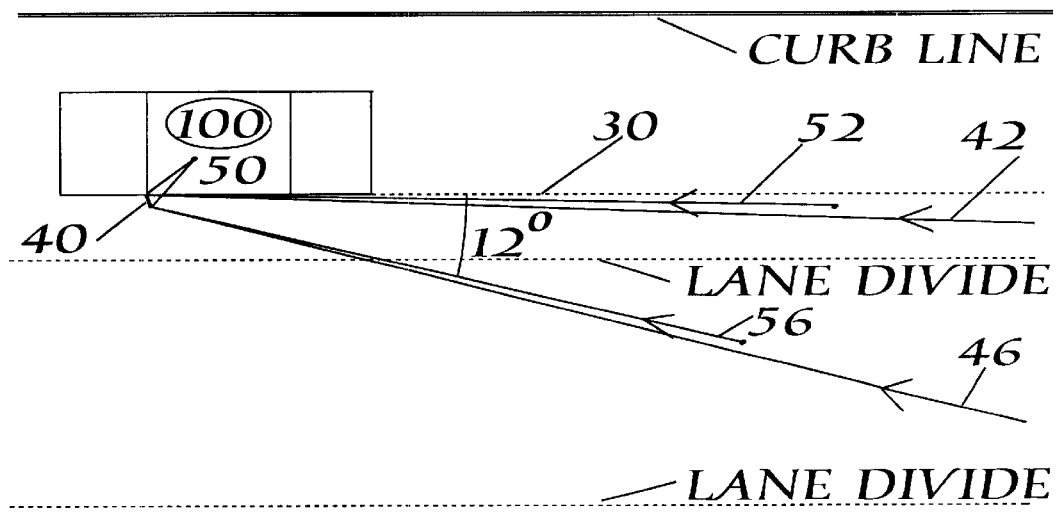
*PLAN VIEW : PRIOR ART*  FIG. 1(b)

NOT TO SCALE

PLAN VIEW

BLIND-SPOT PROOF AUTOMOBILE SIDE-VIEW MIRROR

FIELD OF THE INVENTION

This invention is related to the side-view mirror of automobiles, particularly to the elimination of the blind-spot hazard related to such mirrors.

BACKGROUND OF THE INVENTION

For automobiles driven in the United States, it is the standard practice to have a planar mirror for rear view, a curved mirror for the right-side view, and a planar mirror for the left-side view. A number of inventions of the past reflect the development of mirrors for these purposes. For example, a rear-view mirror comprising a plane glass sheet silvered in the rear, U.S. Pat. No. 1,808,740 issued to Weatherbee, functions alternately during day or night through a mechanical switch. Another form of rear-view mirror that comprises a plurality of vertical mirror strips of progressively varying inclination, the inclination increasing in opposite directions from the center toward the outer edges was patented by Gray vide U.S. Pat. No. 3,806,232. The strips comprising such a device are so positioned relative to one another that in combination, they provide the result of a curved mirror. The curved side-view mirror generally used for right-side view presents to the driver an unrealistic perception of image distance, a well-known hazard. On the other hand, the mirror of the planar type used for left-side view presents a different hazard; that of leaving a blind spot. A wide mirror could remedy this, but use of large mirrors that project excessively to the outside need to be avoided. This led to the use by some drivers of a small separate curved mirror to be attached within the front surface of the conventional side-view mirror. Such an arrangement is however not convenient for viewing, and additionally is cause for the incorrect perception of distance that is characteristic of curved mirrors. Recently, however, side-view mirrors that avoid the blind spot have been invented. Jose C. Palathingal presented such a side-view mirror under U.S. Pat. No. 5,838,505. A device of potentially greater longevity and ease of manufacture was subsequently patented by Jose C. Palathingal, vide U.S. Pat. No. 6,074,068. These new devices however generate two separate images for the entire field of view, and may cause confusion to drivers, especially in a major highway with several lanes.

The aim of the present invention is an improved version of a side-view mirror for the left that avoids the hazard of the blind spot without introducing a curvature in the mirror configuration, and also avoids a possibility of driver confusion in a multilane major highway.

The present invention is developed consequent of closely investigating the blind spot and studying the distinct separate regions of view presented to the automobile driver by the upper and lower parts of a vertically fixed side-view mirror under driving conditions. Careful observation of the functioning of the mirror will show that whereas the upper part of the mirror directs the view of the driver approximately horizontally backward toward large distances, the lower part of the mirror leads to a downward view of a rear region of the road closest to the automobile. This can be seen from FIGS. 1(a) and 1(b) representing prior art. The mirror used herein, marked 40 is of the conventional planar type, of size roughly 6" width and 3.5" height. It is assumed that the driver eye, marked 50 is positioned at a distance approximately 30 inches from the mirror, at a height roughly 6 inches above the top of the mirror. For simplicity of discussion, only one eye of the driver is considered. As illustrated in FIG. 2, the mirror is mounted nearly vertically at 72° inclination in the horizontal plane to the dashed line 30 drawn horizontally, representing the vertical plane grazing the left side of the auto. Line 30 is hereinafter referred to as the auto left-side line. In this geometry, rays of light reflected from the mirror in directions having inclinations between 36° and 48° to the auto left-side line 30 are directed toward the driver eye 50. In FIGS. 1(a) and 1(b), it is illustrated that near-horizontal rays 42 and 46, the former traveling at little inclination to the auto left-side line 30, and the latter traveling at 12° inclination in the horizontal plane to line 30, reflected from the upper sector of the mirror, are directed toward the driver eye. Horizontal rays can thus be reflected by the mirror into the driver eye positioned at a greater height because in normal use, the orientation of the mirror is adjusted by the driver to provide an upward angular tilt of roughly 5° to 10° by rotation about a horizontal axis. Rays 52 and 56, originating from a point on the road in the vicinity of the auto, and traveling at inclinations approximately 0° and 12° respectively to the vertical plane of the auto left side, are reflected from the bottom sector of the mirror toward the driver eye. FIG. 2 illustrates that rays of light 32 and 36 of unspecified points of origin are reflected along paths 34 and 38 toward the driver eye 50 at inclinations 36° and 48° respectively to line 30. Thus it becomes clear that the visual range of the driver for side view on the road on the left of the auto is 0° to 12° to the auto left-side line 30. The close-by region seen on account of the lower one-third of the mirror surface enables view of the section of the road of a rear distance ranging typically from 30 feet to 50 feet from the mirror. The road surface in the left rear at distances shorter than 30 feet do not come into view. The estimates of distances are not expected to be accurate because they depend on a number of assumptions and approximations. The upper two-third of the mirror provides view beyond 50 feet, extending toward the horizon. An extraneous vehicle 110 approaching from large distances can be seen by the driver of the vehicle 100, hereinafter called the primary vehicle, on account of the upper part of the mirror 40. As the extraneous vehicle comes within 50 feet, it becomes visible through the lower part of the mirror. Since the directional range of view is about 0° to 12° on the left, the road width the driver of vehicle 100 can see sideways is 6 feet at a road distance 30 feet behind and 10 feet at 50 feet behind. Assuming that the extraneous vehicle 110 keeps a side distance of roughly 6 feet from the primary vehicle 100, the vehicle 110 becomes invisible to the driver of vehicle 100 as vehicle 110 arrives closer than about 30 feet behind the driver of vehicle 100. The extraneous vehicle has to advance further and be within about 5 behind the driver of the primary vehicle before it could be seen by the driver through peripheral eye vision. Thus, the range of road distance in the lane left of the primary vehicle toward the rear, 5 to 30 feet could be roughly defined as the blind spot.

SUMMARY OF THE INVENTION

The considerations discussed above suggest that, in order to obtain a view of the blind spot, the lower part of the mirror needs to be altered, whereas the upper part is left to be of the conventional single-planar type. In the mirror of the invention, the lower part of the mirror shall provide the automobile driver with one or more directional ranges of view different from the directional range provided by the upper part. The view so provided by the lower part shall include the region of the blind spot mentioned above and illustrated in FIG. 2.

The present invention is a rectangular mirror that comprises a transparent plate, one side of the plate being single-planar. The opposite side of the plate comprises two sectors, one sector that is planar and another that is zig-zagged. In a preferred embodiment, one side of the plate is single-planar. The opposite side comprises a planar sector and a zig-zagged sector. In this embodiment, with the mirror fixed vertically, the planar side of the mirror plate forms the frontal surface whereon light is incident. The opposite side forms the rear, and the zig-zagged sector is below the planar sector. The zig-zagged sector comprises a plurality of series of surface strips, each series being constituted of strips identical in shape and surface area, mutually parallel, and inclined at a predetermined angle relative to the single-planar front surface. The angle of inclination of the surface strips is distinct for each series. The surface strips of the different series alternate periodically in an orderly sequence so that the zig-zagged surface is comprised of a plurality of identical zig-zag elements formed of a plurality of surface strips, with intervening angles between adjacent surface strips repeating periodically. The number of zig-zag elements comprising the zig-zagged sector may vary in different embodiments. Yet, a large number of zig-zag elements helps reduce the zig-zag amplitude, marked 18 in FIG. 3(b), and hence avoid a large variation in thickness across the mirror surface.

BRIEF DESCRIPTION OF THE DRAWINGS

FIGS. 1(a) and 1(b) are representative sketches of prior art for (a) a side view, and (b) a plan view that illustrate that, with a conventional planar side-view mirror, the upper part of the mirror is accountable for horizontal and near-horizontal left-side view directed toward large distances, whereas the lower part presents a left-side view of the road close to the automobile.

DETAILED DESCRIPTION OF THE PREFERRED EMBODIMENTS

Figure 4:
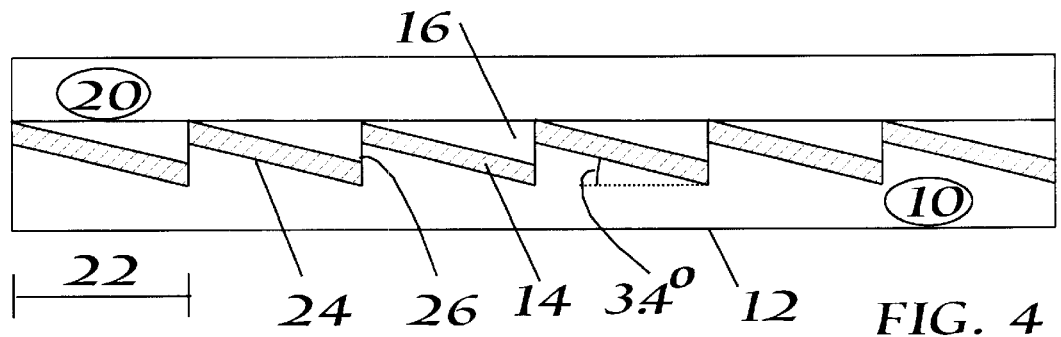
FIG. 4 presents a sketch, not to scale, of a horizontal cross section of the zig-zagged sector of the mirror of the invention of the preferred embodiment, fixed in a vertical position with the surface having the zig-zagged sector in the rear.

A horizontal cross section of the zig-zagged sector of the mirror of the invention in a preferred embodiment is represented by FIG. 4. The preferred transparent material of the mirror plate 10 is Flint glass of index of refraction 1.65. Mounted vertically, the mirror plate measures nearly 6" wide and 3.5" high. The thickness is 3/16". The frontal surface of the mirror plate whereon light is incident is a single-plane, whereas the rear surface is planar for the upper sector, and zig-zagged for the lower sector. The upper sector, which constitutes a planar mirror of the conventional type, is defined to cover approximately two-third surface area of the mirror. The lower sector hence covers one-third. In this embodiment, the zig-zag elements 22 comprise of surface strips of series 24 inclined at a small angle, about 3.4° to the front flat surface 12, and surface strips of series 26 approximately perpendicular to surface 12. In the embodiment illustrated the number of zig-zag elements is 6. Accordingly the width of the surface strips of series 24 in the embodiment described is slated to be 1.0", and the width of surface strips of series 26 is approximately 0.06".

Figure 2:
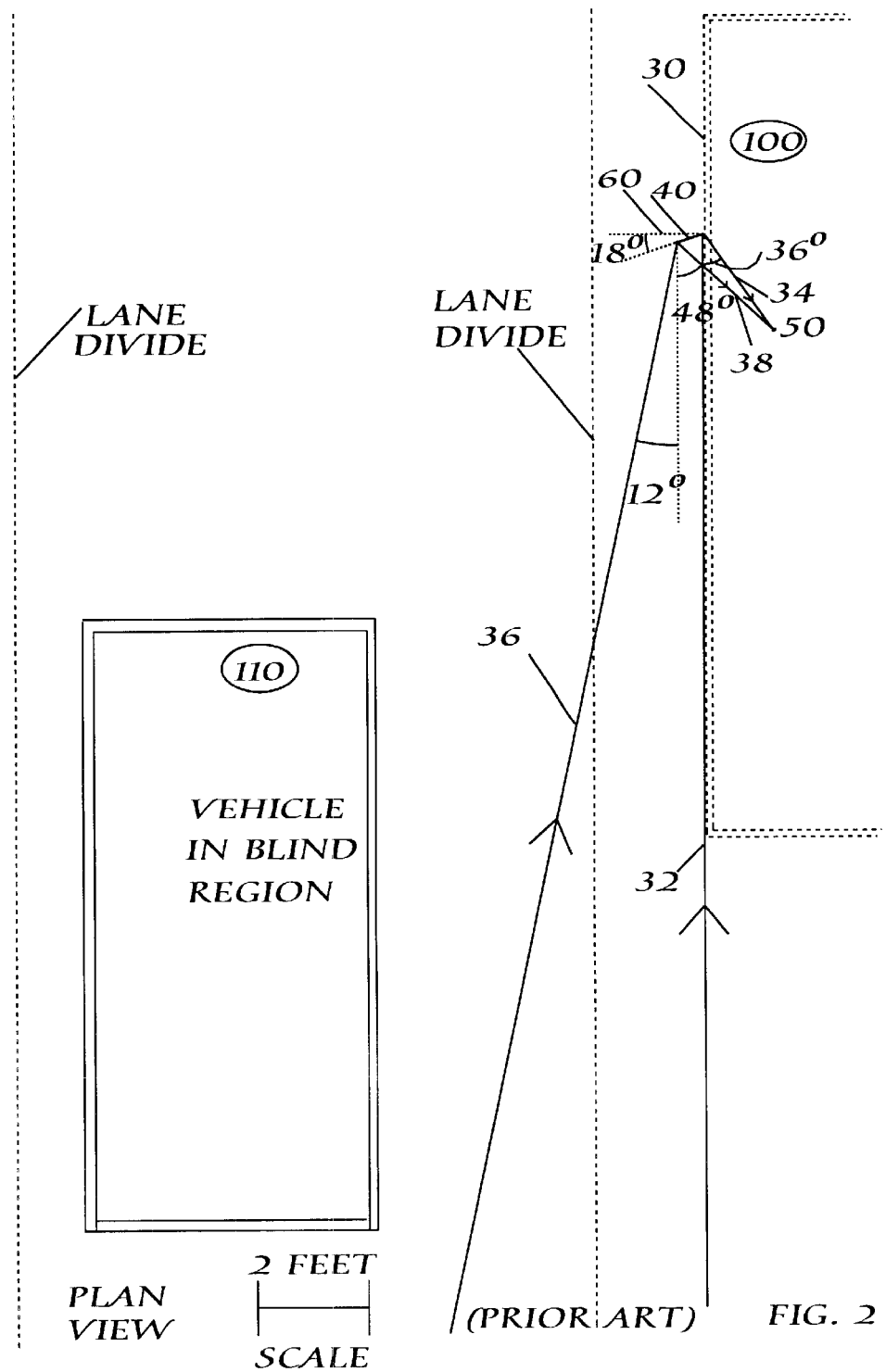
FIG. 2 shows a plan view which illustrates the presence of a blind sport in the field of view of a conventional planar side-view mirror (prior art)
Figure 7:
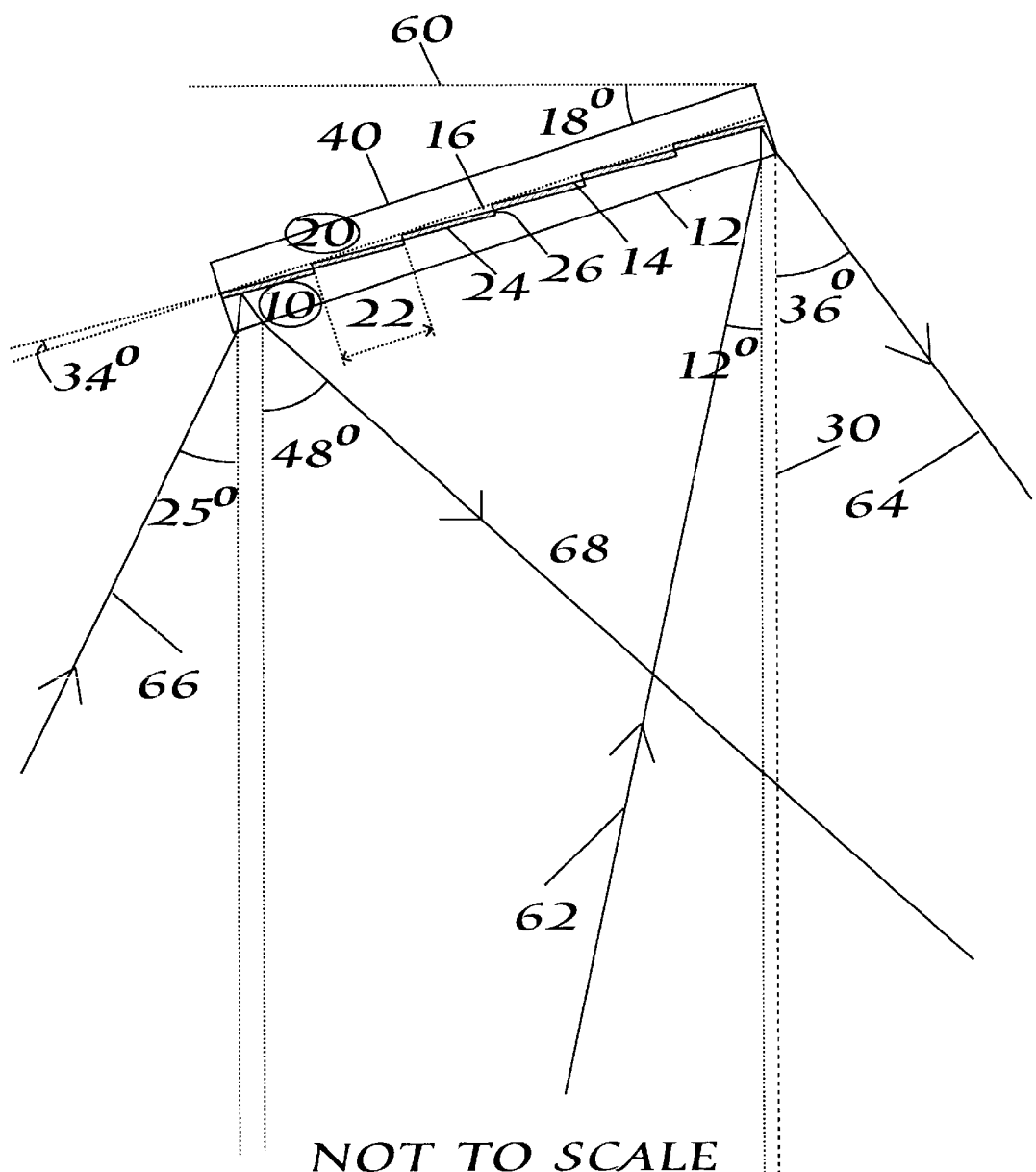
FIG. 7 is a plan view that illustrates the range of directions that comes into the field of view owing to zig-zagged sector of the mirror of the invention in the preferred embodiment illustrated by FIG. 4.

As shown in FIG. 7, the planar frontal surface 12 of the mirror is at an inclination 18° to the horizontal line 60 drawn parallel to the vertical plane of the auto front. FIG. 7 illustrates the functioning of the mirror of the invention. The inclination 18° said above is identical to the inclination of the conventional planar mirror illustrated in FIGS. 1(a), 1(b) and 2. For this reason, the upper sector of the mirror of the invention which is planar will enable the driver to have the same directional range of view 0° to 12° on the left relative to the auto left-side line 30. The reflector-coated surface strips 24 in the rear of the transparent mirror plate 10 are inclined to line 60 at 14.6°. It may be noted here again for discussion that the mirror subtends at the position of the driver eye 50 an angular range 36° to 48° relative to the auto left-side line 30. In FIG. 7, ray 62 originating from a point on the road in the left vicinity and traveling at 12° inclination to the vertical plane covering the auto left side, incident on the lower sector of the mirror front 12 at a point close to the end of the mirror nearest to the auto body shall have an angle of incidence 30°. This ray will be refracted into the transparent mirror material, of refractive index 1.65, at an angle of refraction 17.6°, and will hence be incident thereafter on the reflector coating 14 on the rear of the transparent plate 10 at an angle of incidence 14.2° to be reflected at the same angle relative to the normal. The reflected ray will be incident inside the glass on the front surface at an angle of incidence 10.8° and hence be refracted outward into air as ray 64 at an angle of refraction 18.0°, which corresponds to an inclination 36° to the auto left-side line 30. This ray is hence directed toward the eye of the driver. On the farthest end of the new directional range of visibility, a ray 66 originating from a point on the road surface in the left vicinity and traveling at 25° inclination to the left side vertical plane of the auto is directed toward a point in the lower sector of the mirror at its farthest end from the auto body. The angle of incidence on the frontal surface 12 is 43°, and the angle of refraction into the glass shall be 24.4°. This leads the ray to be incident on the reflector coating in the rear at an angle of incidence 21°. Reflected back at the same angle relative to the normal, the ray will be incident at a angle of incidence 17.6° on the front surface within the glass, to be refracted outward into the air as ray 68 at an angle of refraction 29.9°, which corresponds to an angle of inclination approximately 48° to the auto left-side line 30. Hence ray 68 also is directed toward the driver eye 50. Thus it becomes clear that the continuous range of directions at inclinations between 12° and 25° to the auto left-side line 30 in the left vicinity of the auto provides the field of view presented by the lower sector of the mirror.

Figure 8:
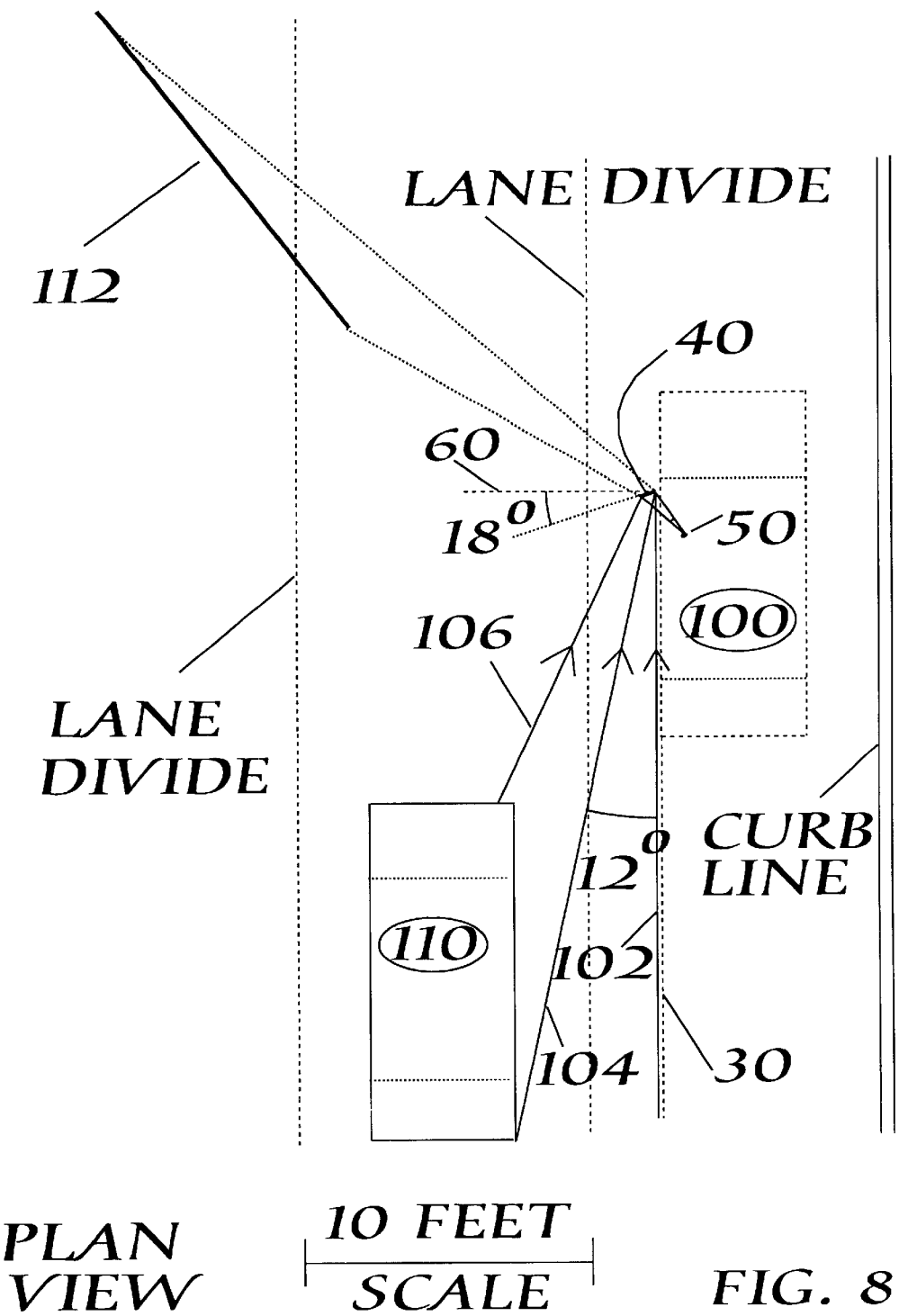
FIG. 8 presents a plan view that illustrates how an extraneous automobile moving in the region of the blind spot is brought into view by the mirror of the invention.

The results of the above considerations are reflected in FIG. 8. With mirror 40 mounted nearly vertically, the upper sector which is of the conventional planar type is at an inclination 18° to line 60. This sector of the mirror hence provides a directional range of viewer 0° to 12°. The extremes of this range are represented by rays 102 and 104. The range of view for the lower, zig-zagged sector of the mirror is 12° to 25°, and is represented by the rays 104 and 106. An extraneous vehicle 110 on the side, while at a distance roughly 50 feet or larger from the primary vehicle 100 is seen in its entirety by the driver of vehicle 100 through the upper sector of the new side-view mirror. While approaching forward and coming closer than 30 feet, the extraneous vehicle is no more visible through the upper sector of the side-view mirror, but becomes visible through the lower sector with its right side seen along line 112. This region within 30 feet covers the blind spot of the conventional mirror. Since the lower sector of the mirror presents view of the left rear region of the road only close to the auto 100, less than 50 feet behind, and of a road width no more than about 10 feet at 50 feet distance toward the rear, and less for shorter distances, as described previously, the mirror of the present invention does not cause driver confusion. The view provided by the upper sector is distinct; limited to distances larger than 50 feet.

Figure 3A:
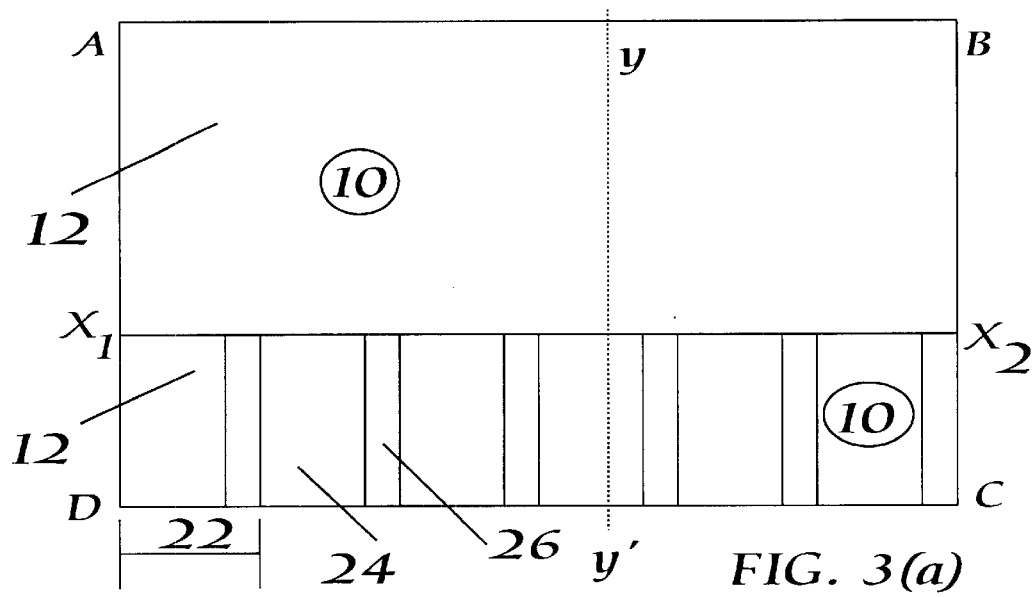
FIG. 3(a) illustrates the frontal planar view of the mirror of the invention in a particular embodiment, vertically-fixed having the surface with a zig-zagged sector in the front.
Figure 3B:
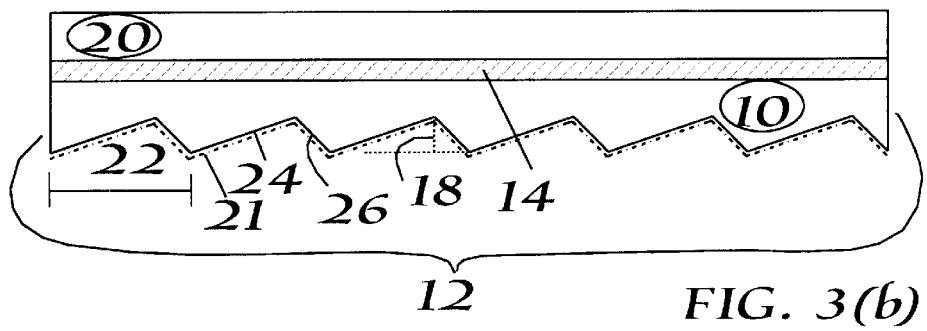
FIG. 3(b) shows a horizontal cross section, not to scale, of the zig-zagged sector of the mirror of the embodiment of FIG. 3(a) mounted vertically.
Figure 3C:
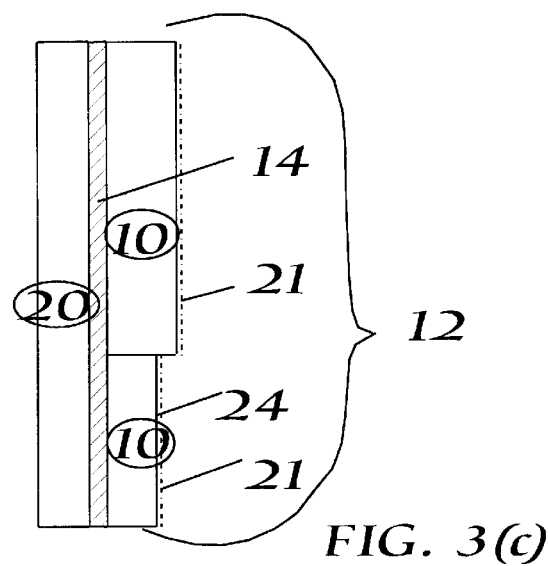
FIG. 3(c) represents a vertical cross section, not to scale, of the embodiment of FIG. 3(a), mounted vertically, drawn along line yy' of FIG. 3(a).
Figure 3D:
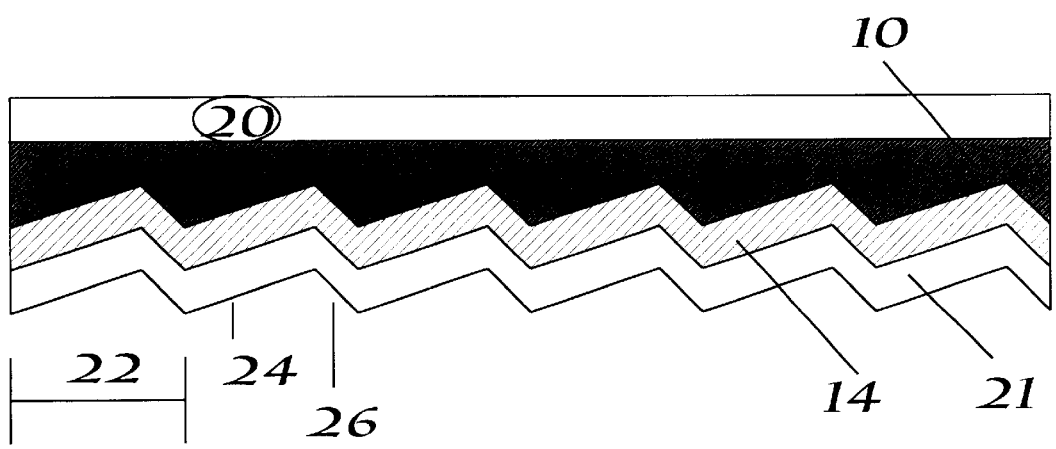
FIG. 3(d) illustrates a horizontal cross section of the zig-zagged sector of an embodiment, not to scale, in which the mirror plate is non-transparent, but polished or reflector-coated in front, and provided with a transparent cover.
Figure 5:
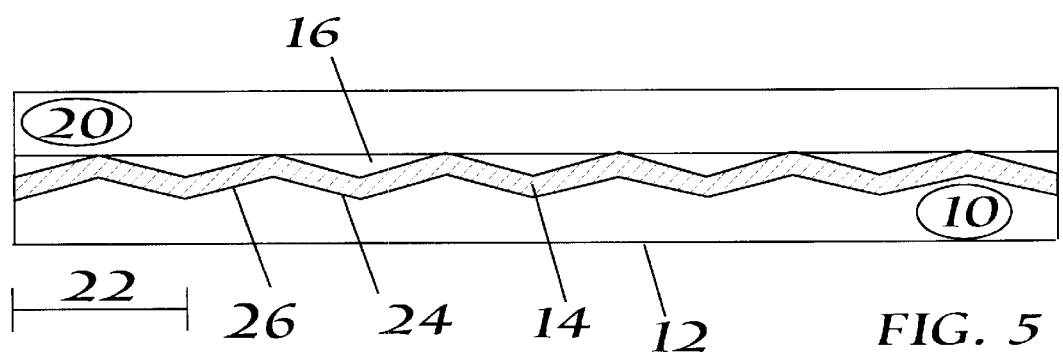
FIG. 5 shows a sketch, not to scale, of a horizontal cross section of the zig-zagged sector of the mirror of the invention of another embodiment, fixed in a vertical position with the surface having the zig-zagged sector in the rear.
Figure 6:
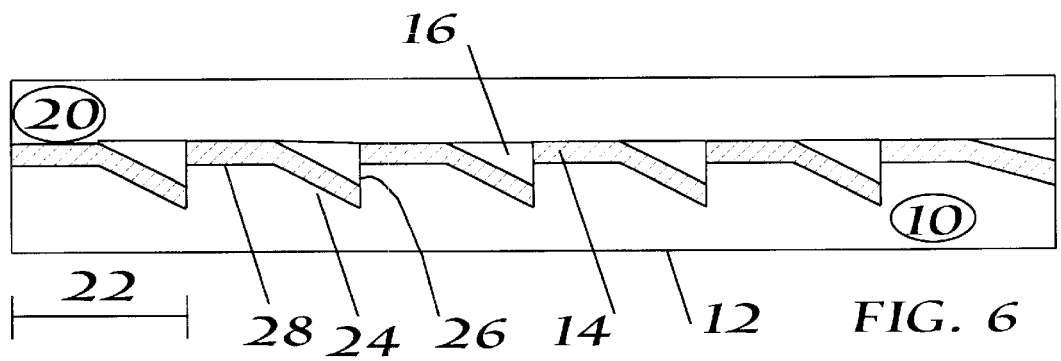
FIG. 6 represents a sketch, not to scale, of a horizontal cross section of the zig-zagged sector of the mirror of the invention of still another embodiment, fixed in a vertical position with the surface having the zig-zagged sector in the rear.

FIGS. 3(a), 3(b) and 3(c) illustrate a second preferred embodiment in which the zig-zagged sector appears in the front. The area ABCD of FIG. 3(a) represents the whole frontal surface, 12. The mirror plate is marked 10. The rear surface of the mirror plate is single-planar, and is silvered for reflection. The upper sector of the frontal surface is also planar, represented by the area $ABX_2X_1$, and the zig-zagged sector, area $X_1X_2CD$ is below. It comprises of a series of identical zig-zag elements 22. Each element 22 is comprised of one each of surface strips of series 24 and 26. FIG. 3(b) presents a cross section of the zig-zagged sector for this mirror embodiment. FIG. 3(c) shows a vertical cross section of the embodiment of FIG. 3(a) drawn along line yy'. An embodiment in which the mirror plate is not transparent is illustrated by FIG. 3(d). Herein, the mirror plate is polished in the front to function as a reflector, or is reflector-coated 14 on the front surface, and provided with a transparent front cover plate or sheet 21. Horizontal cross sections of the zig-zagged sector for some other possible preferred embodiments of the mirror, while mounted vertically, are illustrated by FIGS. 5 and 6. For these embodiments, the frontal surface 12 is single-planar, and the zig-zagged sector of the mirror shall present views for two distinct directional ranges, of which one can be set to be the same as the range of the conventional planar mirror. In the four embodiments 3(b), 4, 5, and 6, the rear surface of the mirror plate 10 is coated with reflector material; with the coating marked 14. In particular, the embodiment of FIG. 6 has zig-zag elements, 22 comprising of three surface strips, 24, 26 and 28. A back support 20 of any suitable material or materials and shape may be provided in the rear of the mirror of the invention for protection and mechanical strength. In particular embodiments, the back support comprises of two sheets, one being a sheet of non-abrasive padding positioned in contact with the reflector coating as a protection for the coating, and another of a hard material that could serve as a mechanical buffer in the rear. Also, in particular embodiments, the empty spaces 16 appearing between the reflection coating and the back support are filled with filler material that does not react chemically with or damage otherwise the coating material, but acts as a protection against corrosion.

In the descriptions above, the mirror of the invention has been cited for left-side view, but embodiments with minor alteration, example, reversed inclinations of the surface strips, can function as right-side view mirror. Also, a rear-view mirror can be devised by combining left-view and right-view embodiments with a planar sector.

Several modifications of the invention can be divined by those proficient in the art, but should be considered as within the scope of this invention. For, example, the shapes of the mirror can be different, the materials can differ, and the zig-zag elements 22 can have different contours, and vary in number and size. Sections of the mirror, including the zig-zag elements, can be made of the same or different materials and assembled together as components of a whole mirror embodiment. It is also possible to have the planar and zig-zagged sectors positioned differently across the mirror surface, or vary in proportions of surface area. The back support 20 can be made of layers of different materials. The spaces 16 between the zig-zag elements and the back-support can be filled with a suitable filler material. Embodiment variations can be made also by having the zig-zagged surface sector in the front or in the rear of the mirror, and reflection coating done on the planar or the zig-zagged surface. A transparent cover plate 21 can be provided in the front of the mirror for protection against damage or corrosion.

What is claimed is:

1. A side-view mirror for automobiles, comprising (i) a back support (ii) a transparent mirror plate, and, (iii) a reflector coating;
    the reflector coating being positioned between the back support and the transparent mirror plate,
    the transparent mirror plate having a first surface that is planar, and a second surface comprising a first sector that is planar and a second sector that is zig-zagged,
    the zig-zagged sector of the second surface comprising a plurality of successive identical zig-zag surface elements,
    the zig-zag surface elements comprising a plurality of series of planar surface strips,
    the line of intersection of adjacent planar surface strips being parallel to the planar first sector of the second surface of the transparent mirror plate,
    each series of planar surface strips comprising a plurality of planar surface strips, of identical dimensions, mutually parallel, and inclined to the planar first sector of the second surface at a predetermined angle,
    the plurality of series of planar surface strips being mutually inclined, and,
    the surface strips of the plurality of series alternating periodically in a fixed sequential order across the zig-zagged surface.

2. The mirror of claim 1, wherein the first sector of the second surface is parallel to the first surface of the transparent mirror plate.

3. The mirror of claim 2, wherein the plurality of series of planar surface strips comprises of a first series and a second series.

4. The mirror of claim 3, wherein the planar first surface of the transparent mirror plate is the front surface whereon light is incident, and the second surface is the rear surface.

5. The mirror of claim 4, wherein the rear surface of the transparent mirror plate is reflector-coated.

6. The mirror of claim 3, wherein the parallel planar surface strips comprising the first series are inclined to the planar first surface at a small predetermined angle.

7. The mirror of claim 6, wherein the parallel planar surface strips comprising the second series are approximately perpendicular to the planar first surface.

8. The mirror of claim 6, wherein the small predetermined angle is between 2° and 5°.

9. The mirror of claim 3, wherein the planar first surface is the rear surface while the mirror plate is fixed vertically, and the second surface is the front surface whereon light is incident.

10. The mirror of claim 1, wherein the planar first sector of the second surface is the upper sector while the mirror plate is fixed vertically, and the zig-zagged second sector is the lower sector.

11. The mirror of claim 10, wherein the transparent mirror plate is approximately rectangular, of surface area 6" wide× 3.5" high, and a thickness of approximately 3/16".

12. A mirror of claims 11, wherein the first sector and the second sector of the second surface extend across the full width of the transparent mirror plate.

13. A mirror of claim 12, wherein the first sector of the second surface comprises a surface area approximately 2/3 of the area of the second surface.

14. The mirror of claim 1, wherein the refractive index of the material of the transparent mirror plate is approximately 1.65.

15. A mirror of claim 1, wherein the transparent mirror plate is mounted inside a cover box.

16. A mirror of claim 15, wherein the transparent mirror plate is rotatable within the cover box.

17. A mirror of claim 1, wherein the transparent mirror plate is an assembly of transparent components.

18. A mirror of claim 1, wherein a transparent protection sheet is provided in the front of the front surface of the transparent mirror plate.

19. A side-view mirror for automobiles comprising
(i) a back support
(ii) a mirror plate
(iii) a reflector coating, and,
(iv) a transparent front cover sheet,
the reflector coating being positioned between the mirror plate and the transparent front cover sheet,
the mirror plate having a first sector that is planar, and a second sector that is zig-zagged,
the zig-zagged sector comprising a plurality of successive identical zig-zag elements,
the zig-zag elements comprising a plurality of series of planar strips,
each series of planar strips comprising a plurality of planar strips, of identical dimensions, mutually parallel and inclined to the planar first sector of the mirror plate at a predetermined angle,
the plurality of series of planar strips being mutually inclined,
the planar strips of the plurality of series alternating in a fixed sequence across the zig-zagged sector of the mirror plate, and,
the line of intersection between adjacent planar strips being parallel to the surface of the planar first sector of the mirror plate.

20. A side-view mirror for automobiles comprising
(i) a back support
(ii) a mirror plate, and,
(iii) a transparent cover sheet in front,
the mirror plate having a first sector that is planar and a second sector that is zig-zagged,
the zig-zagged sector comprising a plurality of successive identical zig-zag elements,
the zig-zag elements comprising a plurality of series of planar strips,
each series of planar strips comprising a plurality of planar strips, of identical dimensions, mutually parallel and inclined to the planar first sector of the mirror plate at a predetermined angle,
the plurality of series of planar strips being mutually inclined,
the planar strips of the plurality of series alternating in a fixed sequence across the zig-zagged surface of the mirror plate,
a plane tangential to the zig-zag elements being parallel to the surface of the planar first sector of the mirror plate, and,
the mirror plate having one side polished for reflection of incident light,
the polished side of the mirror plate facing toward the transparent cover sheet.

* * * * *